United States Patent
Möller et al.

(10) Patent No.: US 9,970,762 B2
(45) Date of Patent: May 15, 2018

(54) TARGET POINT DETECTION METHOD

(71) Applicant: LEICA GEOSYSTEMS AG, Heerbrugg (CH)

(72) Inventors: Bernd Möller, Lüchingen (CH); David Grimm, Zürich (CH); Falko Henning, Bodolz (CH); Hans-Martin Zogg, Uttwil (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 401 days.

(21) Appl. No.: 14/727,657

(22) Filed: Jun. 1, 2015

(65) Prior Publication Data

US 2016/0349049 A1 Dec. 1, 2016

(51) Int. Cl.
 *G01C 15/02* (2006.01)
 *G01C 15/00* (2006.01)
 *G01S 17/42* (2006.01)
 *G01C 1/02* (2006.01)
 *G01S 17/66* (2006.01)

(52) U.S. Cl.
 CPC ............. *G01C 15/002* (2013.01); *G01C 1/02* (2013.01); *G01S 17/42* (2013.01); *G01S 17/66* (2013.01)

(58) Field of Classification Search
 CPC .................................................... G01C 15/002
 See application file for complete search history.

(56) References Cited

U.S. PATENT DOCUMENTS

| | | | |
|---|---|---|---|
| 5,696,734 A * | 12/1997 | Corrigan | G01V 1/364 367/22 |
| 6,734,952 B2 | 5/2004 | Benz et al. | |
| 2005/0225777 A1* | 10/2005 | Falbel | G01C 1/00 356/614 |
| 2007/0064246 A1* | 3/2007 | Braunecker | G01S 17/06 356/614 |
| 2011/0285592 A1 | 11/2011 | Green et al. | |
| 2012/0249783 A1* | 10/2012 | Nindl | G01C 15/002 348/135 |
| 2012/0327271 A1* | 12/2012 | Nordenfelt | G01C 1/04 348/239 |

(Continued)

FOREIGN PATENT DOCUMENTS

WO 2012/004342 A1 1/2012

*Primary Examiner* — Charlie Y Peng
(74) *Attorney, Agent, or Firm* — Maschoff Brennan

(57) ABSTRACT

The invention pertains to a target point detection method for an automatic search of at least one target point in a surveying environment in advance of a precise measurement of the at least one target point with a surveying device. In some embodiments, the surveying environment may include a plurality of points of non-interest, where a point of non-interest is a reflective object or surface, or a target comprising at least one retroreflector being positioned at each target point. In some embodiments, a method may include emitting electromagnetic radiation to illuminate retroreflectors emitted in the form of a vertical fan which is movable through a horizontal angular range; receiving signals reflected from retroreflectors within a fan-shaped detection area, determining at least a horizontal angle to the retroreflectors, assigning a time mark and/or a distance to each of the signals, and storing the detected signal in a two-dimensional data structure.

7 Claims, 6 Drawing Sheets

(56) References Cited

U.S. PATENT DOCUMENTS

| | | | |
|---|---|---|---|
| 2013/0054187 A1* | 2/2013 | Pochiraju | G01C 3/08 |
| | | | 702/150 |
| 2013/0278758 A1* | 10/2013 | Von Matern | G01S 5/163 |
| | | | 348/135 |
| 2016/0010973 A1* | 1/2016 | Bridges | G01B 11/002 |
| | | | 356/625 |

\* cited by examiner

TARGET POINT DETECTION METHOD

The invention relates to a target point detection method for an automated search for target points in a surveying environment and to a surveying instrument suitable to perform such a target point detection method.

In surveying it is known to use surveying instruments such as total stations for certain surveying methods. Therefore, the transformation of measurement data into an existing coordinate system is required. Such a transformation, for instance, can be done via measurement points that are already known beforehand.

At present, different laser signals are used for finding target points. While the surveying instrument moves, a horizontal position of a target point is detected with a first laser signal. Thereafter, a fine search is performed by using a different laser signal.

From the prior art, total station instruments are known that have of a so-called power-search sensor which is adapted to perform an automated search for passive targets, i.e. targets comprising a retroreflector such as a prism. Examples of such total stations and target search methods are disclosed in U.S. Pat. No. 6,734,952 B2, US 2011/0285592 A1 and WO 2012/004342 A1. In said search methods, the power-search (PS) sends out a laser fan and receives reflected signals from the retroreflectors—or sometimes also from other reflective objects. Furthermore, in case of several retroreflectors in the field of view, the PS returns the first found retroreflector. Quite often, reference points are marked with a prism or other reflective surfaces (e. g. reflective tapes) and might be not of interest for the actual search. Nevertheless, the actual PS stops at every target prism and at every unwanted reflection. Thus, there is a need for a method allowing a fast and reliable determination of all available target points of a surveying environment, particularly of new target points of the surveying environment, as well as for a surveying instrument capable to perform the method.

It is an object of the invention to provide a method that allows localizing a measurement target faster and more efficiently.

It is a particular object to provide such a method wherein the measurement target is a new target in a surveying instrument comprising a plurality of points of non-interest.

It is another particular object to provide such a method wherein the measurement target is a movable target after a loss of lock when tracking the target.

A further object of the invention is to provide a surveying instrument, particularly a total station, for performing said method.

At least one of these objects is achieved by the implementation of the characterizing features of the independent claims.

A first aspect of the invention relates to an improved method for performing an initial PS scan. For the initial PS scan, the instrument searches all the retroreflectors in the field of view and registers at least the horizontal position, or the horizontal and vertical position (viewed from the instrument), and optionally also the distance to the object. According to this aspect of the invention, these positions are saved in a list of points to be ignored by all future searches (filter list). The filter list is used to reject previously known points found by PS. From the filter list the surveying instrument knows which target and other reflections have to be ignored. Furthermore, more points can be added to the list, e. g. by importing the coordinates of these points or adding them manually. The user can add known fixed reference points coordinates which are added to the list for the PS exclusion functionality. Now, if a further reflective target is introduced to the surveying environment, the PS finds the new target straight away, as the PS sensor does not stop at any targets or reflections which have been configured based on the initial PS scan.

A target point detection method according to this aspect of the invention comprises an automatic search of at least one target point in a surveying environment in advance of a precise measurement of the at least one target point with a surveying device, wherein the surveying environment comprises at least one target point, a target comprising a retroreflector being positioned at each target point, and a plurality of points of non-interest, each comprising a reflective object or surface. The automatic search comprises emitting electromagnetic radiation to illuminate reflective objects in the surveying environment, receiving reflections from reflective objects in the surveying environment, determining at least one coordinate of each of the reflective objects, storing the at least one determined coordinate of at least one target point, and providing the stored coordinates to a user. According to the invention, the method comprises a filtering procedure for filtering out points of non-interest during the automatic search, in the course which filtering procedure information about at least one previously known point of non-interest in the surveying environment is provided before the automatic search, the at least one previously known point of non-interest is marked as to be ignored in the course of the automatic search, and information about at least one target point that corresponds to a received reflection and that is not marked is provided to a user.

In one embodiment of the target point detection method, the filtering procedure comprises omitting
  the emission of electromagnetic radiation into the direction of a previously known point of non-interest, and/or
  the reception of signals from the direction of a previously known point of non-interest.

In one embodiment, the automatic search comprises determining for each of the reflective objects whether the at least one coordinate corresponds to that of a previously known point of non-interest.

In another embodiment, only coordinates which do not correspond to those of a previously known point of non-interest are stored.

In yet another embodiment, coordinates corresponding to those of a previously known point of non-interest are provided to the user separately from coordinates which do not correspond to those of a previously known point of non-interest.

In another embodiment of the target point detection method, coordinates corresponding to those of a previously known point of non-interest are provided to the user with a tag for designating the coordinates as belonging to a previously known point of non-interest.

In one embodiment of this method, the tag comprises at least one of striking out, use of a different color, and use of a different font size or type.

In a further embodiment, for each previously known point of non-interest a two- or three-dimensional non-interest area is defined that encompasses the respective point of non-interest, and points located in the non-interest area are treated as previously known point of non-interest.

In one embodiment, a shape and/or size of said non-interest area are selectable by a user.

In another embodiment, the point of non-interest is a center point of the non-interest area.

In another embodiment of the target point detection method, the at least one coordinate is one of absolute coordinates, a distance, a horizontal angle, a vertical angle and a time mark.

In yet another embodiment of the target point detection method, the at least one coordinate of the at least one previously known point of non-interest is provided by a user of the surveying instrument or imported from a memory device.

In a further embodiment of the target point detection method, the at least one previously known point of non-interest is a result of a previous search of the surveying device.

In another embodiment, the electromagnetic radiation is emitted in the form of a fan which is movable through an angular range.

A surveying device adapted to precisely measure target points in a surveying environment and to perform an automatic search of target points, a target comprising at least one retroreflector being positioned at each target point, according to this aspect of the invention comprises a transmitter unit adapted to emit electromagnetic radiation to illuminate reflective objects in the surveying environment, a receiver unit adapted to receive reflections from reflective objects in the surveying environment, and an analysis evaluation unit adapted to determine at least one coordinate of each of the reflective objects, and storing the at least one determined coordinate of at least one target point. According to the invention, the surveying device comprises input means adapted to allow the provision of information about at least one previously known point of non-interest in the surveying environment to the analysis evaluation unit, the analysis evaluation unit is adapted to perform a filtering procedure for filtering out points of non-interest, wherein previously known points of non-interest are marked as to be ignored in the course of the automatic search, and the surveying device comprises output means to provide to a user information about target points that correspond to the received reflections and are not marked target points.

In one embodiment of this surveying device,
the surveying device comprises a total station,
the input means allow a user input of previously known target point, and
the output means is a display of the total station or of a remote controller connected to the total station.

In another embodiment, the transmitter unit is adapted to emit the electromagnetic radiation in the form of a vertical fan which is movable through a horizontal angular range and capable of being rotated through a full circle.

In yet another embodiment, the receiver unit comprises a location-resolving optical-electronic detector.

A second aspect of the invention relates to a special search which is performed when during a tracking procedure of the surveying device the lock on the prism of a tracked target gets lost. In case of losing the prism lock, the surveying instrument performs another PS scan, in order to re-lock on the prism.

According to this aspect of the invention all the targets known from an initial PS scan and the point list get excluded in order to have the instrument find the correct prism: After losing the prism in the lock case, the PS starts a search of the prism, wherein the PS search window is now not the full field of view of the surveying instrument but rather a defined three-dimensional search area (e. g. a cube) around the last known position of the prism.

During the tracking of the target, the search area gets constantly updated based on the position of the target. The size of the search area (e. g. a side length of a cube) can optionally be defined by the user as a setting (e. g. based on horizontal and vertical angles, distances around the prism etc.).

A target point detection method comprising an automatic search of at least one target point in a surveying environment in advance of a precise measurement of the point with a surveying device, a target comprising at least one retroreflector being positioned at the target point, the surveying device comprising a transmitter unit, a receiver unit and an analysis evaluation unit, according to the second aspect of the invention comprises
emitting electromagnetic radiation to illuminate reflective objects in the surveying environment,
receiving reflections from reflective objects in the surveying environment,
determining at least one coordinate of each of the reflective objects, and
storing the at least one determined coordinate of at least one target point.

According to the invention, for searching a target point for which an assumed position is available, the method comprises a recovery procedure in the course of which
based on the assumed position a limited three-dimensional search area is defined which encompasses the assumed position, and
the electromagnetic radiation is emitted in the direction of the search area, searching the target point in the search area only.

In one embodiment of the target point detection method, during the automatic search the electromagnetic radiation is emitted in the form of a vertical fan which is movable through a horizontal angular range, and during the recovery procedure the vertical fan is moved through the horizontal angular range corresponding to the direction of the search area.

In another embodiment the fan is capable of being rotated through a full circle.

In yet another embodiment a shape and/or size of the limited three-dimensional search area are selectable by a user.

In a further embodiment the assumed position is the last known target position of a target tracked by the surveying device.

A surveying device adapted to precisely measure target points in a surveying environment and to perform an automatic search of target points, a target comprising at least one retroreflector being positioned at each target point, according to the second aspect of the invention comprises a transmitter unit adapted to emit electromagnetic radiation to illuminate reflective objects in the surveying environment, a receiver unit adapted to receive reflections from reflective objects in the surveying environment, and an analysis evaluation unit adapted to determine at least one coordinate of each of the reflective objects, and storing the at least one determined coordinate of at least one target point. According to the invention, the analysis evaluation unit is adapted to define a limited three-dimensional search area encompassing an assumed position of a target, and the surveying device is adapted to emit electromagnetic radiation in the direction of the search area, searching the target in the search area only.

In one embodiment, the surveying device comprises tracking means adapted to track a movable target based on a received signal that is reflected from a retroreflector of the target, and the assumed position is the last known target position of a target tracked by the surveying device.

Presently preferred embodiments of the invention will be described on the basis of the Figures. In the drawings:

FIGS. 1, 2 and 3 illustrate a first aspect of the invention.

Figure 1:
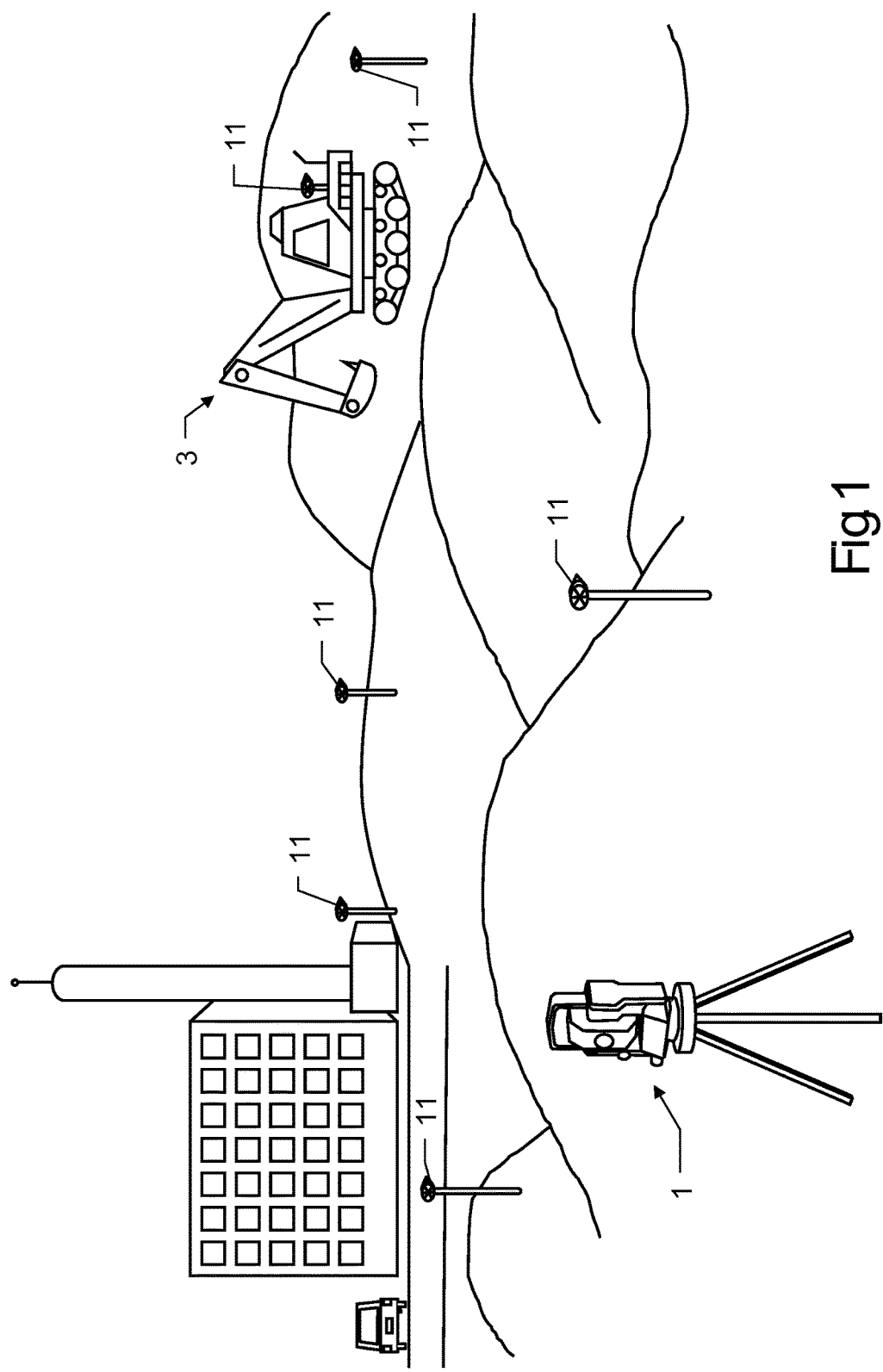
FIG. 1 is a schematic view of a surveying device in a surveying environment comprising a plurality of targets.

FIG. 1 shows a surveying environment in which a surveying instrument embodied by a total station 1 and a plurality of retro-reflective targets 11 (e. g. surveying poles comprising a prism) are positioned. One of the targets 11 is positioned on an excavator 3 and is thus movable.

Figure 2:
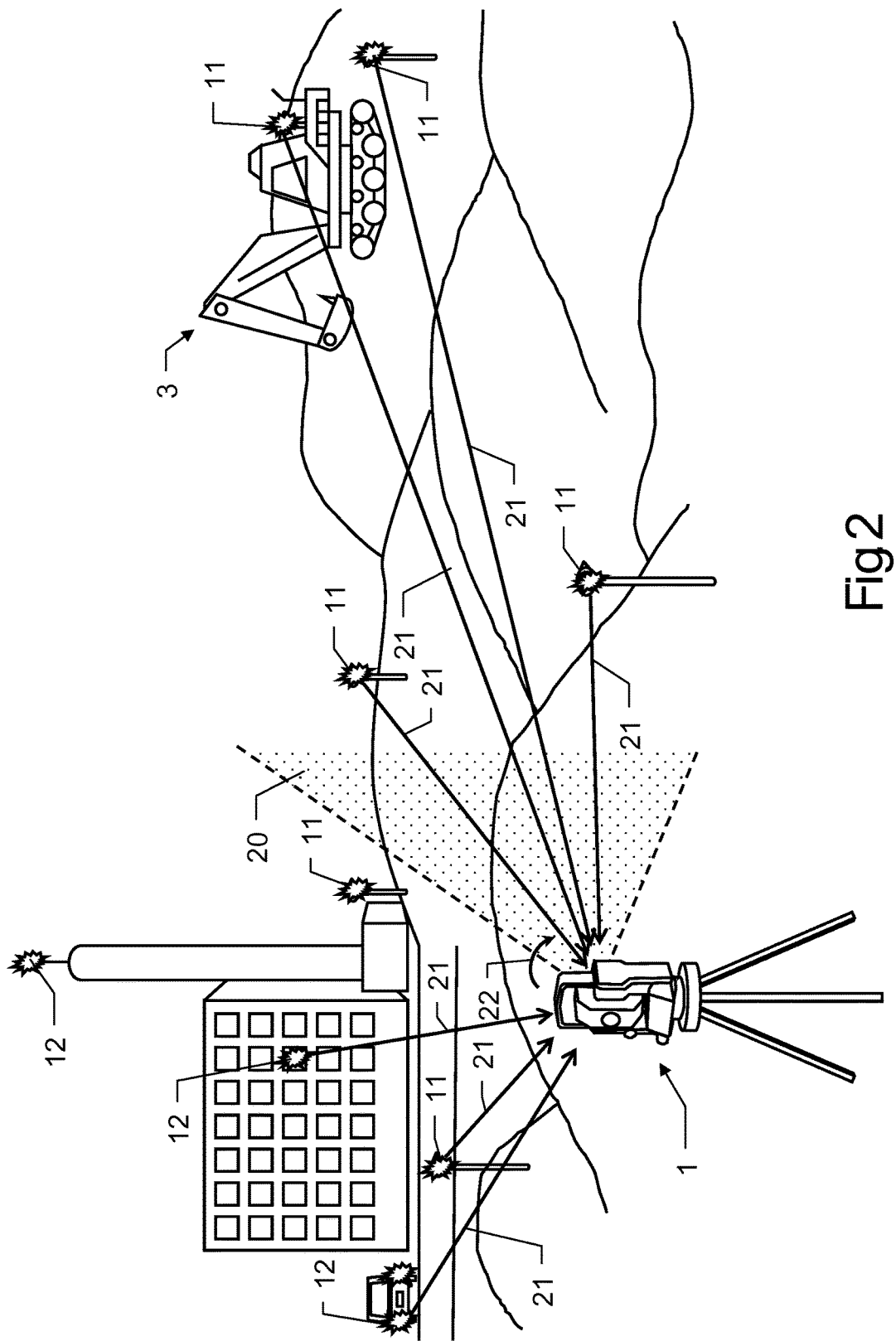
FIG. 2 shows the surveying environment of FIG. 1, illustrating an automatic search for targets of the surveying device.

FIG. 2 illustrates an initial power-search (PS) performed by the total station 1 in the surveying environment of FIG. 1. The total station 1 comprises a transmitter unit which is adapted to emit electromagnetic radiation in the form of a vertical fan 20. The transmitter unit is provided in a rotatable part of the total station 1, and the vertical fan 20 performs a movement 22 through a horizontal angular range of the surveying environment. When the electromagnetic radiation of the vertical fan 20 hits a retroreflective target 11, a part of the radiation is reflected as a return signal 21 to a receiver unit of the total station 1 which is adapted to receive the signals within a fan-shaped detection area. The receiver unit preferably comprises a location-resolving optical-electronic detector. Also other reflective or retro-reflective surfaces 12, such as windows or cat's eye reflectors can return a signal 21.

Coordinates of the reflections can then be stored. The coordinates comprise a horizontal and a vertical angle of the returning signal 21 and optionally distance information (e. g. derived by time-of-flight measurement), or three-dimensional coordinates in a relative or absolute coordinate system.

Figure 3:
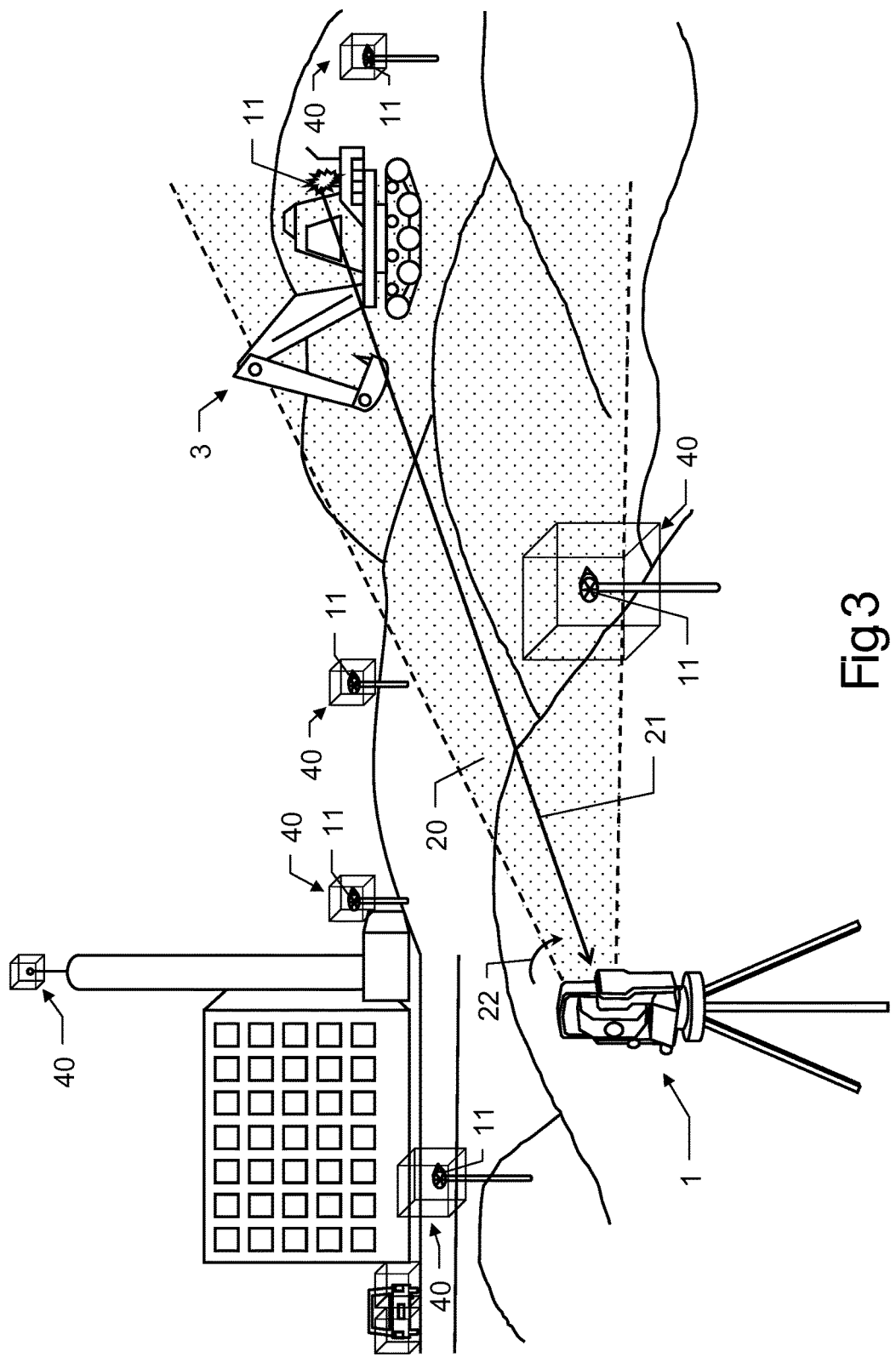
FIG. 3 shows the surveying environment of FIG. 1, illustrating an automatic search for targets of the surveying device, wherein targets, the position of which is already known, are ignored.

FIG. 3 shows the exclusion of the targets 11 that have been determined in the initial PS scan of FIG. 2 for a further search. With the initial PS scan, targets 11 and other reflecting objects 12 within the field of view of the PS of the total station 1 have been identified. For all subsequent PS scans these initially found reflections are ignored so that only newly added targets or targets moved to a new position will be found. By this, the likelihood to only find the correct target is increased, and the time to find this target is significantly decreased.

In FIG. 3, for the new scan, a three-dimensional tolerance area 40 is defined around the positions of the targets and other reflections that should be ignored. Signals coming out of one of these tolerance areas 40 are ignored in the PS. Thus, only the target 11 mounted on the excavator 3 which has moved to a new position with respect to the initial PS scan is found by the new scan.

The points to be ignored are stored in a filter list. This list of points can be generated either by using an initial PS scan as shown in FIG. 2 or by using a pre-defined list of points which can be entered manually or imported from a memory device.

After the setup of the surveying device 1 (e. g. total station), the device performs an initial 360° PS scan and registers all the reflective spots (mainly targets 11) in its field of view. According to the invention, found targets 11 can be excluded from future PS runs. Furthermore, additional known reference (e. g. known in the data base) can be added to the "exclusion" list for the PS scan.

The PS scan can be integrated in an automated setup routine, where the total station looks for fixedly installed known targets. The point list can be stored in the total station in a controller of the total station or in an external computer to which a data connection is establishable.

An example workflow of the first aspect of the invention comprises the following steps:
  setup total station 1 or establish robotic connection;
  perform an initial 360° PS scan to find reflective spots (targets 11 etc.) which define areas 40 to not consider for further PS;
  lock onto prism of target 11;
  if lock gets lost, start PS which does not stop for reflective spots which have been deselected after the initial 360° PS run or are known from an available list of points, retrieving the prism on the target 11; and
  re-lock onto prism and continue the measurements.

According to a second aspect of the invention, a search functionality reduces the search area of the PS based on an assumed position of a target. FIGS. 4 to 8 illustrate this aspect of the invention using the example of an application where the total station is locked onto a prism of the target and follows this prism. In case the prism is lost by the total station—e. g. if the line of sight between the total station and the target gets interrupted—a three-dimensional area is defined around the last known position automatically, and the PS is performed within this area only.

Figure 4:
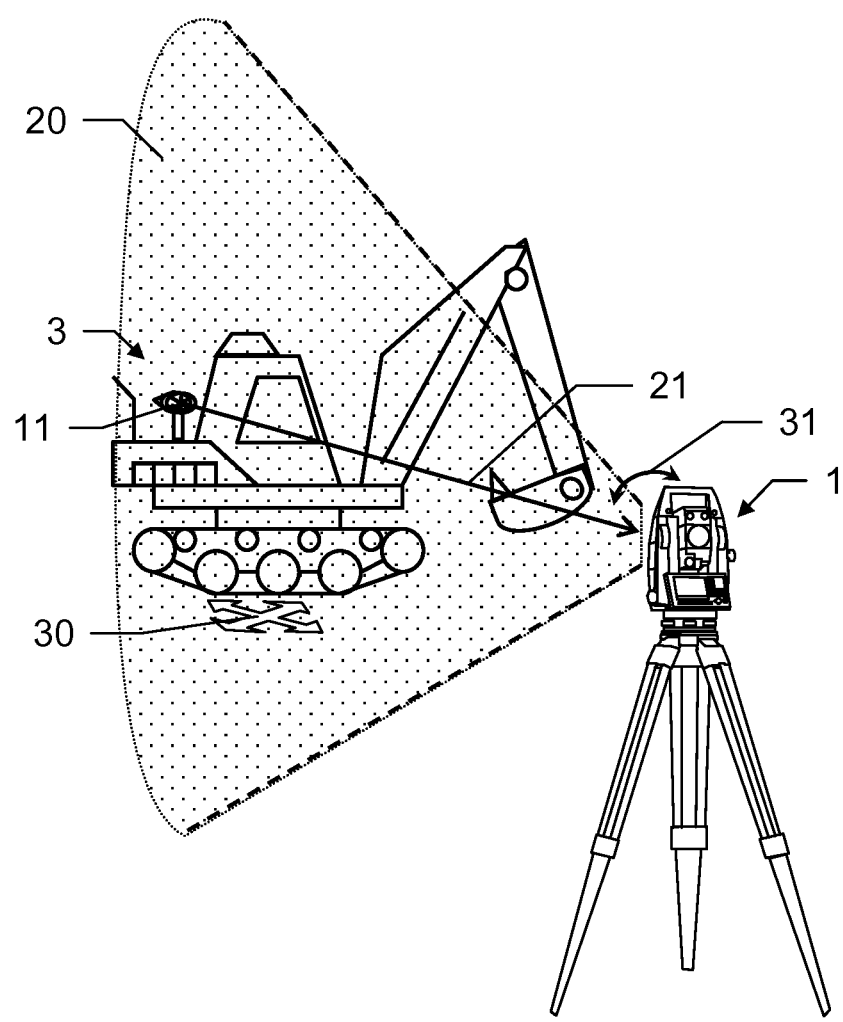
FIG. 4 shows a surveying device tracking the position of a mobile target.

FIG. 4 shows a total station 1 having a tracking functionality tracking a movable retro-reflective target 11. In this example, the target 11 is mounted on an excavator 3 which performs movements 30 in the surveying environment. The total station 1 comprises a transmitter unit which is adapted to emit electromagnetic radiation in the form of a vertical fan 20. The transmitter unit is provided in a rotatable part of the total station 1, and the vertical fan 20 can perform a movement 22 through a horizontal angular range of the surveying environment. When the electromagnetic radiation of the vertical fan 20 hits a retro-reflective target 11, a part of the radiation is reflected as a return signal 21 to a receiver unit of the total station 1 which is adapted to receive the signals within a fan-shaped detection area. The receiver unit comprises means for tracking the target by issuing commands to a motor of the total station to perform a rotating movement 31 of the part of the total station 1 comprising the transmitter unit in order to follow the movements 30 of the target 11 with the fan 20. The receiver unit preferably comprises a location-resolving optical-electronic detector.

Figure 5:
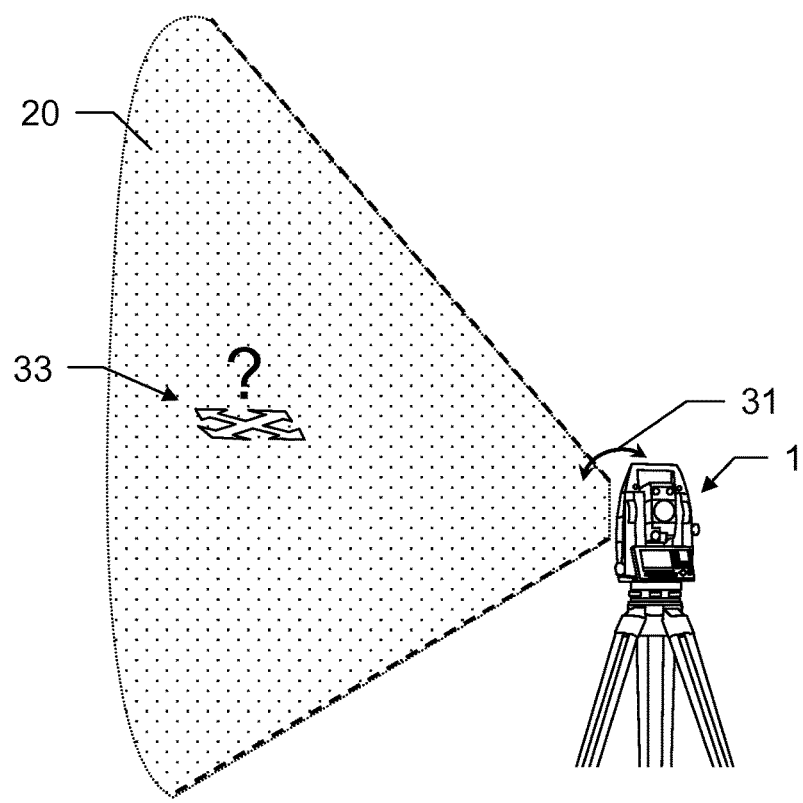
FIG. 5 shows the surveying device of FIG. 4, wherein the surveying device has lost the tracked target.

FIG. 5 shows a situation, where the lock on the target has been lost, so that the receiver unit does not receive a signal and the tracking cannot be continued without performing a search for the target beforehand. For instance, the sight to the target could have been blocked for a few seconds while the excavator performed an unknown movement 33.

Figure 6:
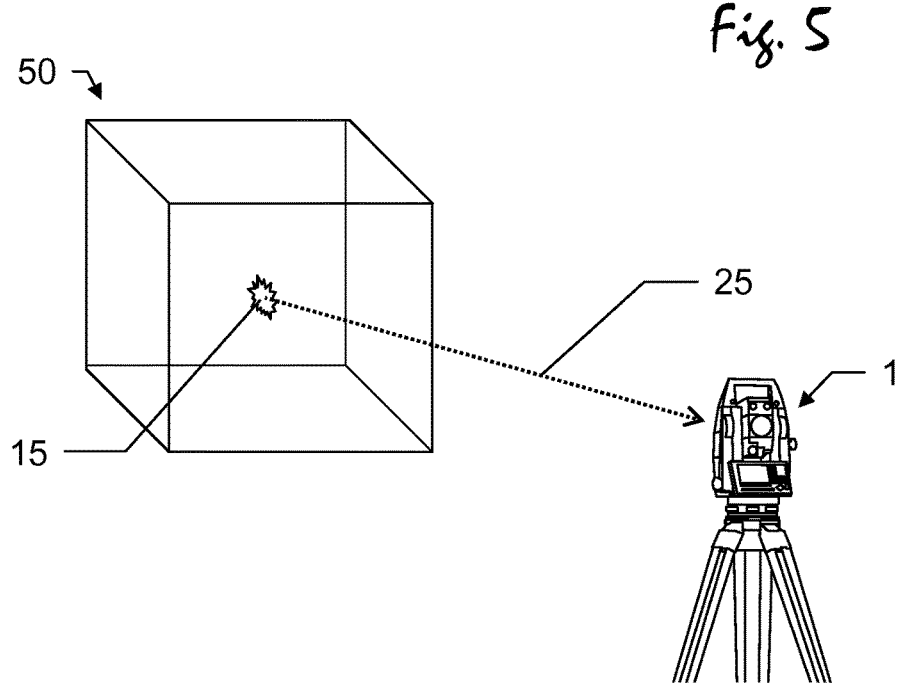
FIG. 6 shows the surveying device of FIG. 5 and a virtual three-dimensional search area enclosing the last known position of the tracked target.

FIG. 6 illustrates how a search area 50 is defined around an assumed rough position 15 of the target. In the case of a lost tracked target (as shown in FIG. 5) the assumed rough position 15 is the last known position of the target, i.e. the position of the target when the lock on the target was lost, which is defined by the last signal 25 received by the receiver unit of the total station 1. In this example, the search area 50 has the form of a cube. However, it could as well be a sphere or any other three-dimensional body, e. g. a cone. The extension of the cube is variable (e. g. by a predefined value from the user). Furthermore, the cube can be defined in terms of length and with and height from the actual target position and/or based on the horizontal and vertical values from the instrument to search finally the prism with PS.

Figure 7:
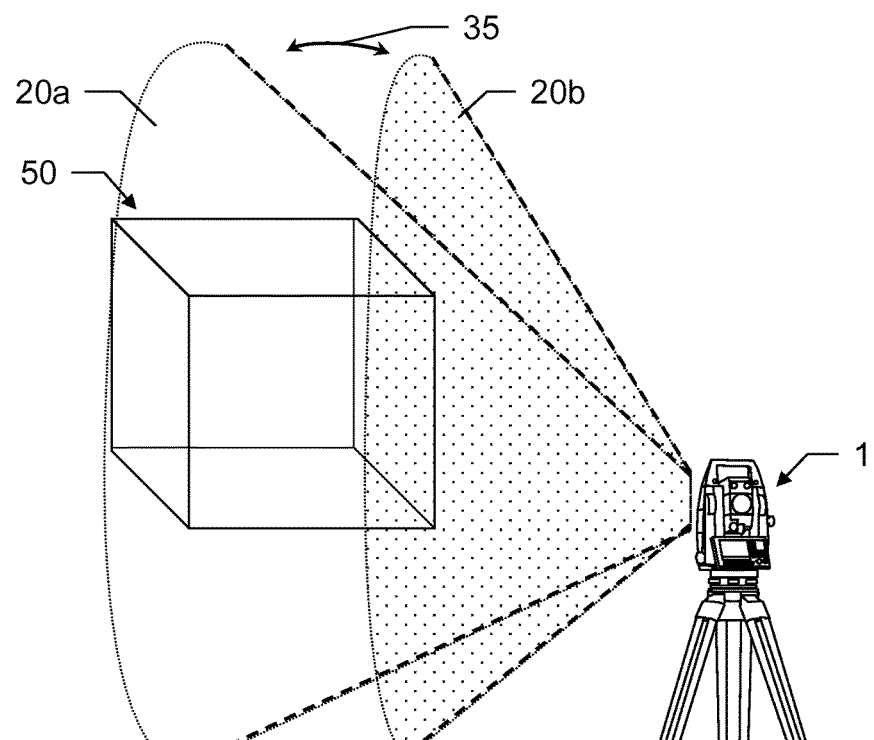
FIG. 7 shows the surveying device and the search area of FIG. 6, wherein the surveying device performs an automated search for the lost target within the search area.

FIG. 7 illustrates the use of the cubic search area 50 for the relocation of the lost target. The vertical fan 20 is emitted only into those directions in which it hits a part of the search area 50. In this example, the transmitter unit of the total station 1 is turned to a position in which the emitted fan 20*a* transects the left border of the search area 50. Then, the radiation constantly being emitted, that part of the total station 1 comprising the transmitter unit performs a search movement 35 to the right, so that the complete search area 50 consecutively is scanned for the lost target—either until the target is found and the search is stopped, or until the emitted fan 20*b* reaches the end of the search area 50. During the search, all targets and other reflections not lying in the search area 50 (i.e. lying behind or in front of the area) may be ignored.

Also a combination with the first aspect of the invention is possible: previously known targets the position of which prism accidentally falls into the defined search area 50 can nonetheless be ignored during the search.

Figure 8:
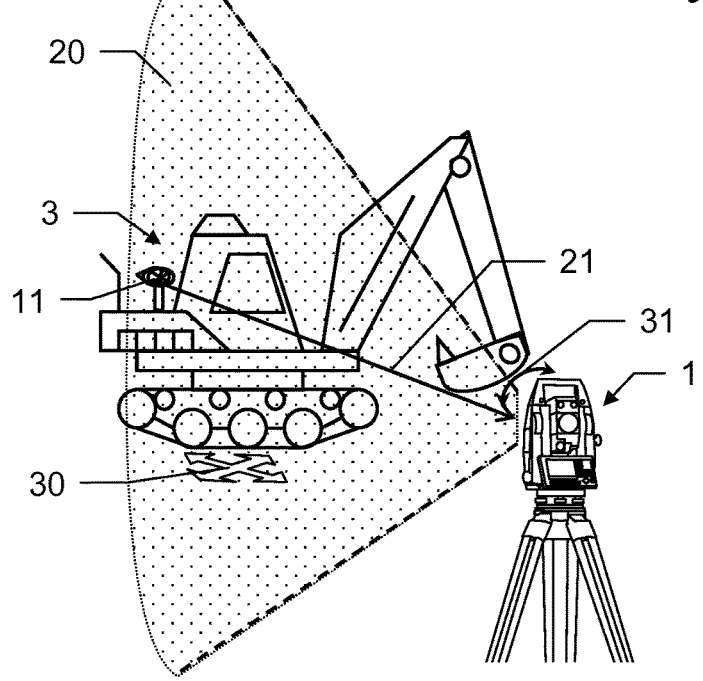
FIG. 8 shows the surveying device having found the lost target and continuing tracking the target.

In FIG. 8 the correct target 11 has been recovered within the defined search area 50 and the tracking can continue.

The method according to the second aspect of the invention can also be used to search for a target (static or mobile) that is assumed to be at a certain position but cannot be found at this position.

An workflow of the second aspect of the invention comprises the following steps:
lock onto a prism which is mounted on a prism pole (surveying use case) or any moving platform (e. g. excavator);
track the prism with the surveying device (i.e. follow the prism and measure the distance to the prism);
if the prism gets lost (e. g. interrupted line of sight between device and prism), the device starts a new search routine to recover and relock onto the prism;
the search routine does not move further than within the pre-defined search area, recovering the prism; and
re-lock onto the prism and continue with measuring.

The various methods, procedures, and devices described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments, combinations, sub-combinations and/or uses and obvious modifications and equivalents thereof. Accordingly, the invention is not intended to be limited by the specific disclosures of preferred embodiments herein.

The invention claimed is:

1. A surveying device adapted to precisely measure target points in a surveying environment and to perform an automatic search of target points, a target comprising at least one retroreflector being positioned at each target point, the surveying device comprising:
a transmitter unit adapted to emit electromagnetic radiation to illuminate reflective objects in the surveying environment;
a receiver unit adapted to receive reflections from reflective objects in the surveying environment; and
an analysis evaluation unit adapted to determine at least one coordinate of each of the reflective objects, and storing the at least one determined coordinate of at least one target point,
wherein:
the surveying device comprises input means adapted to allow the provision of information about at least one previously known point of non-interest in the surveying environment to the analysis evaluation unit;
the analysis evaluation unit is adapted to perform a filtering procedure for filtering out points of non-interest, wherein previously known points of non-interest are marked as to be ignored in the course of the automatic search;
the surveying device comprises output means to provide to a user information about target points that correspond to the received reflections and are not marked target points; and
the analysis evaluation unit is adapted to define for each previously known point of non-interest a two- or three-dimensional non-interest area that encompasses the respective point of non-interest, and to treat points located in the non-interest area as previously known point of non-interest.

2. The surveying device of claim 1, wherein
the surveying device comprises a total station;
the input means allow a user input of previously known target point; and
the output means is a display of the total station or of a remote controller connected to the total station.

3. The surveying device of claim 1, wherein
the transmitter unit is adapted to emit the electromagnetic radiation in the form of a vertical fan which is movable through a horizontal angular range and capable of being rotated through a full circle.

4. The surveying device of claim 1, wherein
the receiver unit comprises a location-resolving optical-electronic detector.

5. A surveying device adapted to precisely measure target points in a surveying environment and to perform an automatic search of target points, a target comprising at least one retroreflector being positioned at each target point, the surveying device comprising:
a transmitter unit adapted to emit electromagnetic radiation to illuminate reflective objects in the surveying environment, wherein the electromagnetic radiation is emitted in the form of a vertical fan which is movable through a horizontal angular range;
a receiver unit adapted to receive reflections from reflective objects in the surveying environment; and
an analysis evaluation unit adapted to determine at least one coordinate of each of the reflective objects, and storing the at least one determined coordinate of at least one target point, wherein the analysis evaluation unit is adapted to define a limited three-dimensional search area encompassing an assumed position of a target; and the surveying device is adapted to emit electromagnetic radiation in the direction of the search area by moving the vertical fan through the horizontal angular range corresponding to the direction of the search area, searching the target in the search area only.

6. The surveying device of claim 5, wherein the surveying device comprises tracking means adapted to track a movable target based on a received signal that is reflected from a retroreflector of the target; and the assumed position is the last known target position of a target tracked by the surveying device.

7. A surveying device adapted to precisely measure target points in a surveying environment and to perform an automatic search of target points, a target comprising at least one retroreflector being positioned at each target point, the surveying device comprising:

a transmitter unit adapted to emit electromagnetic radiation to illuminate reflective objects in the surveying environment;

a receiver unit adapted to receive reflections from reflective objects in the surveying environment; and an analysis evaluation unit adapted to determine at least one coordinate of each of the reflective objects, and storing the at least one determined coordinate of at least one target point, wherein:

the surveying device comprises input means adapted to allow the provision of information about at least one previously known point of non-interest in the surveying environment to the analysis evaluation unit;

the analysis evaluation unit is adapted to perform a filtering procedure for filtering out points of non-interest, wherein previously known points of non-interest are marked as to be ignored in the course of the automatic search;

the surveying device comprises output means to provide to a user information about target points that correspond to the received reflections and are not marked target points; and the analysis evaluation unit adapted to determine for each of the reflective objects whether the at least one coordinate corresponds to that of a previously known point of non-interest, wherein coordinates corresponding to those of a previously known point of non-interest are provided to the user with a tag for designating the coordinates as belonging to a previously known point of non-interest.

\* \* \* \* \*